Aug. 28, 1934. E. E. TRAFTON Re. 19,298
FILTER
Original Filed Aug. 1, 1931
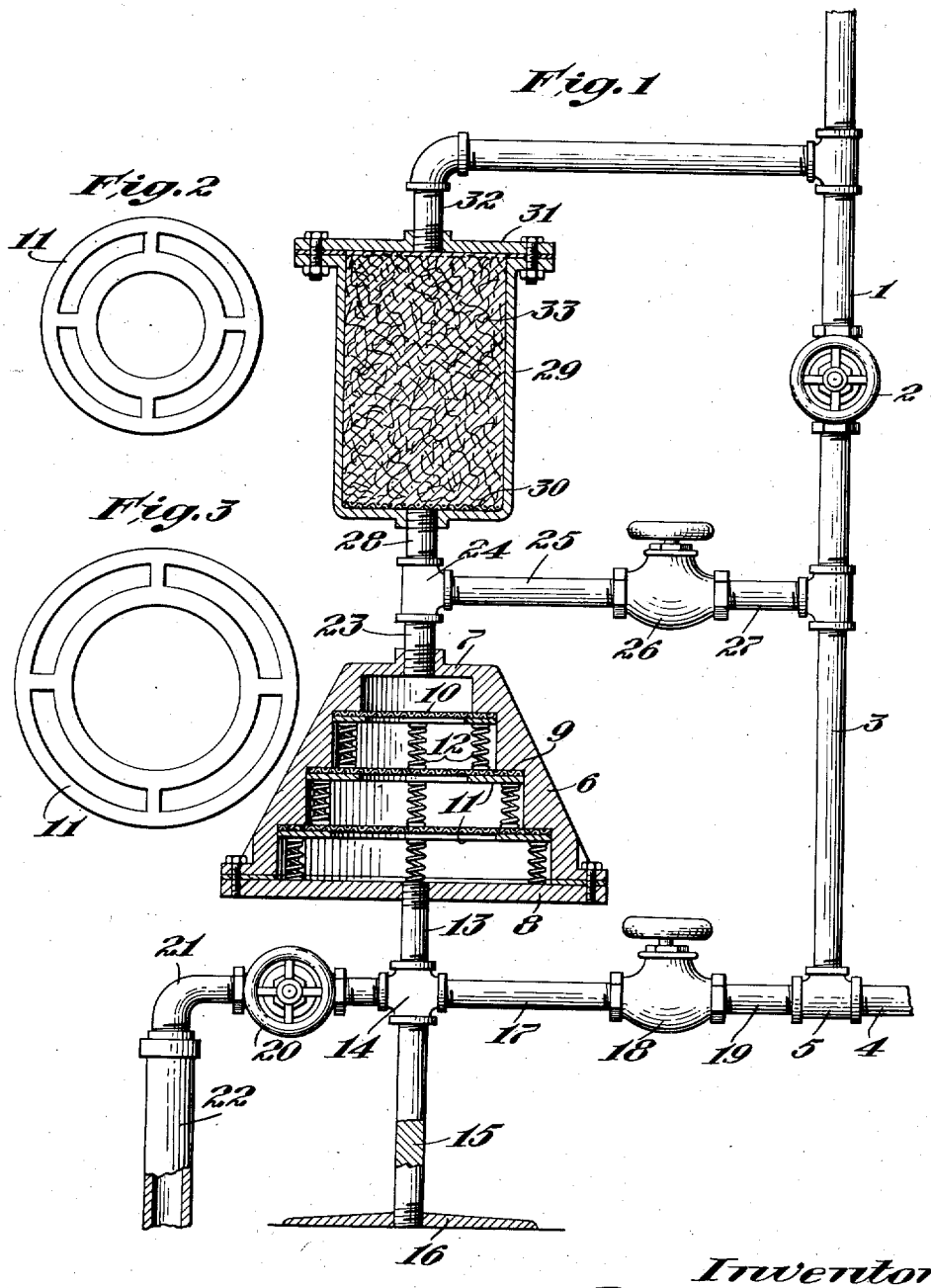
Inventor
Ernest E. Trafton
by Roberts, Cushman & Woodberry
Att'ys.

Reissued Aug. 28, 1934

Re. 19,298

UNITED STATES PATENT OFFICE 19,298

FILTER

Ernest E. Trafton, Portland, Maine, assignor, by mesne assignments, to Avite Products, Inc., Boston, Mass., a corporation Original No. 1,906,932, dated May 2, 1933, Serial No. 554,562, August 1, 1931. Application for reissue June 23, 1934, Serial No. 732,163

2 Claims. (Cl. 210—164)

This invention relates to filters especially adapted for operation in connection with the water systems of buildings and the like and has for the primary object, the provision of a device which may be easily and quickly coupled with a water system and which will efficiently collect sediment and other foreign matter from the water prior to the latter entering the system of the building and which is so constructed that the foreign matter collected may be easily removed by reversing the flow of water through the pipes and the removal of a sediment drain plug.

Another object of this invention is the provision of a filter of the above stated character which will be simple, durable and efficient and which may be manufactured and sold at a comparatively low cost.

With these and other objects in view, this invention consists in certain novel features of construction, combination and arrangement of parts to be hereinafter more fully described.

For a complete understanding of my invention, reference is to be had to the following description, and accompanying drawing, in which Figure 1 is a vertical sectional view illustrating the filter constructed in accordance with my invention.

Figure 2 is a plan view illustrating one of the filtering element supporting members.

Figure 3 is a similar view illustrating another one of the supporting elements.

Referring in detail to the drawing, the numeral 1 indicates a water system of a building or the like and is provided with a control valve 2 which is connected to a pipe 3 that is in turn connected to a water main 4 by a T-coupling 5. My invention is attached to the pipes 1, 3 and 4 and comprises a substantially conical shaped body 6 which has one end fully opened and normally closed by a removable cover or plate 8. The interior of the body 6 is of several diameters of different sizes forming annular shoulders or seats 9 opposing the cover 8 and have placed in engagement therewith filtering elements or screens 10 under which are positioned supporting elements 11 of skeleton formation as shown in Figures 2 and 3. As shown in Figure 1 the filtering elements and their respective supporting elements are superimposed and the supporting elements are urged toward the shoulders or seats by expansion springs 12 thus yieldably maintaining the filtering elements in engagement with their respective seats or shoulders.

An inlet pipe 13 is threaded into a centrally arranged opening in the cover 8 and is in turn connected to a four-way coupling 14. The coupling 14 is connected to the stem 15 of a pedestal 16. A feed pipe 17 is connected to the coupling 14 and to a control valve 18. The control valve 18 is connected to the coupling 5 by a pipe 19 so that water from the main 4 may pass into the body 6 when the valve 18 is in an open position. The other opening of the four-way coupling 14 is normally closed by a removable plug or if desired may be connected to a valve 20 which is connected to a drain pipe 21 having a transparent section 22 connected to a sewer or other drain. The valve 20 is normally closed.

The closed end 7 of the body 6 is provided with a screw threaded opening to receive a pipe 23 connected to a coupling 24. The T-coupling 24 is connected to a pipe 25 which is in turn connected to a valve 26 and the latter is connected to the pipe 3 between the valve 2 and the T-coupling 5 by a pipe 27. A pipe 28 is connected to the T-coupling 4 and supports a casing 29 and is in communication with the interor of the latter. A screen 30 is positioned on the bottom of the casing and overlies the pipe 28. A removable cover 31 closes the casing 29 and is provided with a screw threaded opening to receive a pipe 32 which is in turn connected to the pipe 1 of the water system of the building. The casing 29 is filled with a filtering medium 33 of any desired character.

In operation of the valves 2, 26 and 20 are closed and the valve 18 is opened so that the water passing from the water main 4 to the system of the building or the pipe 1 is compelled to pass through the body 6 and casing 29 and become thoroughly filtered. The foreign matter or sediment entering the body 6 is retained therein by the filtering elements 10 and the cleansed water leaving the body 6 passes through the filtering medium 33 before entering the pipe 1. After the device has been in operation and it is desired to clean the same, the valve 18 is closed and the valves 26 and 20 are opened reversing the flow of water through the body 6 which cleanses the filtering elements 10 by forcing the latter away from the seats and allowing sediment collected thereby to be driven outwardly through the pipes 13 and 21 and the operator may note the sediment passing from the body by the transparent section 22 of the pipe 21 and when the water becomes clear, the device then may be restored for operation for filtering the water again to the pipe 1 by closing the valves 26 and 20 and opening the valve 18.

While I have shown and described the preferred embodiment of my invention, it will be understood that minor changes in construction, combination and arrangement of parts may be made without departing from the spirit and scope of my invention, as claimed.

I claim:

1. A filter comprising a body having a pipe connection at one end and its opposite end fully opened, a cover detachably secured to the body for closing the opened end thereof and having a pipe connection for admitting fluid to the body, said body having the interior thereof of different diameters to provide superimposed seats, disk-like filtering elements engaging the seats, skeleton frames engaging the filtering elements, and springs normally urging the filtering elements against the seat by engaging the frames and adapted to permit the filtering elements to move away from the seats when fluid is admitted to the body by way of said first named pipe connection.

2. A filter comprising a body having a pipe connection at one end, a cover secured to the other end provided with a pipe connection for admitting fluid to the body, the interior of said body being provided with a plurality of superposed seats of different diameters, a plurality of disk-like filtering elements the margins of which respectively are adapted to engage and disengage with the several seats in the body, and supports for the several filtering elements adapted to permit the margins of the filtering elements to engage their seats when fluid is admitted to the body by way of the pipe connection in the cover and to permit the margins of the filtering elements to move away from their seats when fluid is admitted to the body by way of the first named pipe connection.

ERNEST E. TRAFTON.